(12) United States Patent
Kim et al.

(10) Patent No.: US 7,102,811 B2
(45) Date of Patent: Sep. 5, 2006

(54) OPTICAL FIBER AMPLIFIER AND AMPLIFICATION METHOD CAPABLE OF COMPENSATING DISPERSION AND LOSS IN TRANSMISSION THEREOF

(75) Inventors: Sung-Tae Kim, Suwon (KR); Seong-Taek Hwang, Pyongtaek (KR); Yun-Je Oh, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 320 days.

(21) Appl. No.: 10/465,169

(22) Filed: Jun. 19, 2003

(65) Prior Publication Data

US 2004/0130779 A1 Jul. 8, 2004

(30) Foreign Application Priority Data

Jan. 4, 2003 (KR) ...................... 10-2003-0000460

(51) Int. Cl.
*H01S 4/00* (2006.01)
*H04B 10/12* (2006.01)

(52) U.S. Cl. ..................................... 359/334
(58) Field of Classification Search ................ 359/334, 359/337.5
See application file for complete search history.

(56) References Cited

U.S. PATENT DOCUMENTS

| | | | | |
|---|---|---|---|---|
| 5,937,126 A * | 8/1999 | Yamamoto et al. | ......... | 385/123 |
| 6,178,038 B1 * | 1/2001 | Taylor et al. | ............ | 359/337.5 |
| 6,204,960 B1 * | 3/2001 | Desurvire | .............. | 359/341.33 |
| 6,359,725 B1 * | 3/2002 | Islam | ......................... | 359/334 |
| 6,466,362 B1 * | 10/2002 | Friedrich | .................... | 359/334 |
| 6,621,622 B1 * | 9/2003 | Krummrich | ............... | 359/337.4 |
| 6,771,414 B1 * | 8/2004 | Masuda et al. | ........... | 359/341.1 |
| 6,819,477 B1 * | 11/2004 | Tsuzaki et al. | ............. | 359/334 |
| 7,012,741 B1 * | 3/2006 | Hwang et al. | ............... | 359/334 |
| 2002/0060839 A1 * | 5/2002 | Oh et al. | .................. | 359/337.5 |
| 2002/0167717 A1 * | 11/2002 | Masuda et al. | ........... | 359/341.1 |
| 2003/0169482 A1 * | 9/2003 | Kung et al. | .............. | 359/341.1 |
| 2003/0179440 A1 * | 9/2003 | Foursa et al. | ................ | 359/334 |
| 2003/0215241 A1 * | 11/2003 | Hwang et al. | ................. | 398/92 |
| 2004/0114212 A1 * | 6/2004 | Hwang et al. | ............... | 359/334 |

FOREIGN PATENT DOCUMENTS

| | | |
|---|---|---|
| JP | 2000-151507 | 5/2000 |
| JP | 2001-007768 | 1/2001 |
| JP | 2002-344046 | 11/2002 |
| JP | 2002-344052 | 11/2002 |

OTHER PUBLICATIONS

Wen, S and Chi, S., "Distributed Erbium-doped fiber amplifiers with stimulated Raman scattering", IEEE Photonics Technology Letters, vol. 4, No. 2, pp. 189-192 (1992).*

* cited by examiner

*Primary Examiner*—Jack Keith
*Assistant Examiner*—Eric Bolda
(74) *Attorney, Agent, or Firm*—Cha & Reiter, L.L.C.

(57) ABSTRACT

An optical fiber amplifier capable of compensating dispersion and loss of an optical signal in transmission along an optical fiber includes an optical fiber doped with erbium ions and having a dispersion compensating function. The amplifier further includes an erbium pump for performing forward pumping to the optical fiber, and a Raman pump for performing backward pumping to the optical fiber which is forward-pumped by the erbium pump means. When an optical signal passes through the optical fiber which undergoes density inversion of erbium ions and Stimulated Raman Scattering (SRS), dispersion and loss of the optical signal is compensated.

20 Claims, 8 Drawing Sheets

OPTICAL FIBER AMPLIFIER AND AMPLIFICATION METHOD CAPABLE OF COMPENSATING DISPERSION AND LOSS IN TRANSMISSION THEREOF

CLAIM OF PRIORITY

This application claims priority to an application entitled "Optical Fiber Amplifier and Amplification Method Capable of Compensating Dispersion and Loss in Transmission Thereof" filed in the Korean Industrial Property Office on Jan. 4, 2003 and assigned Ser. No. 2003-460, the contents of which are hereby incorporated by reference.

BACKGROUND OF THE INVENTION

1. Field of the Invention

The present invention relates to an optical fiber amplifier and an amplification method for compensating dispersion and loss of an optical signal, and more particularly, to an optical fiber amplifier capable of compensating dispersion and loss of an optical signal in transmission thereof and an amplification method for compensating dispersion and loss of an optical signal using the same.

2. Description of the Prior Art

Data traffic is exponentially increasing owing to the Internet, which is implemented in part with a high Wavelength Division Multiplexing (WDM) optical communication network to accommodate the increase. The latter may be accomplished by increasing the number of transmission channels or by raising the transmission rate per channel. When the transmission rate per channel of the optical signal reaches or exceeds a gigabit per second, the optical signal becomes especially sensitive to the effect of dispersion and may require compensation. One well known method utilizes a Dispersion Compensating Fiber (DCF) having negative dispersion to compensate for positive dispersion occurring in an optical signal.

Use of a DCF to compensate for dispersion of an optical signal results in a large amount of power loss and therefore requires implementation with an additional optical amplifier. The optical transmitter may include, for example, an Erbium-Doped Fiber Amplifier (EDFA). A Raman Amplifier is also widely used for this purpose.

The EDFA applies a pump signal, i.e., a pumped optical signal, to an optical fiber which is doped with the element erbium, in order to directly amplify a received optical signal without having to convert the optical signal into an electric signal. The Raman amplifier uses an optical fiber which serves as a nonlinear medium for generating a scattered pump signal from an incident non-chromatic pump signal to amplify an optical signal.

When the EDFA is used to compensate power loss of an optical signal owing to the DCF, more EDFAs are needed, in proportion to the transmission distance for the optical signal, thereby degrading the Optical Signal Noise Ratio (OSNR). Also, incorporating a DCF and a number of EDFAs into one module disadvantageously increases the volume of the module.

Although use of the Raman amplifier can improve OSNR, the efficiency of Raman amplification is lowered. As a result, a pump Laser Diode (LD) is required to input a high-power pump signal into the optical fiber to obtain a predetermined, suitable level of gain.

SUMMARY OF THE INVENTION

To solve the above-mentioned problems occurring in the prior art, the present invention provides an optical fiber amplifier and amplification method capable of compensating for dispersion and loss of an optical signal in transmission thereof.

In another aspect, the present invention provides an optical fiber amplifier and amplification method capable of maintaining an excellent OSNR.

In a further aspect, the present invention provides an optical fiber amplifier module and amplification method capable of obtaining higher gain efficiency, while incorporating amplifiers into one module in a manner that reduces the volume of the module.

The inventive optical fiber amplifier for amplifying an optical signal in transmission along an optical fiber and compensating dispersion of the optical signal comprises: an Er pump or erbium pump means arranged in a leading end of the optical fiber doped with erbium ions and having a dispersion compensating function and for pumping erbium ions to obtain density inversion of erbium ions; and a Raman pump means arranged in a rear end of the optical fiber and for inducing Stimulated Raman Scattering (SRS) to the optical fiber which undergoes density inversion of erbium ions by the erbium pump means. When an optical signal passes through the optical fiber which undergoes density conversion of erbium ions and SRS, loss and dispersion of the optical signal are compensated.

Preferably, the erbium pump means includes: a pump laser diode for emitting a pump signal, i.e., a pump light signal, having a predetermined pump wavelength; and a wavelength selection coupler for coupling the pump signal emitted from the pump laser diode with an external optical signal to output a coupled optical signal for performing forward pumping to the optical fiber. The optical fiber achieves a desired predetermined level of gain since the erbium ions undergo density inversion and stimulated emission via the coupled optical signal from the wavelength selection coupler, wherein the pump laser diode emits the pump signal having a pump wavelength in the range of about 930 to 1030 nm and 1430 to 1530 nm.

The Raman pump means preferably includes: a plurality of pump laser diodes for generating and emitting plurality of pump signals having wavelengths different from one another in response to pump wavelengths which are set different from one another within a desired predetermined range; a multiplexer for multiplexing the pump signals emitted from the pump laser diodes; and a wavelength selection coupler for coupling an optical signal multiplexed by the multiplexer and an external optical signal to output a coupled optical signal for performing backward pumping to the optical fiber. The erbium-pumped optical fiber obtains a desired predetermined level of gain via SRS in response to the coupled optical signal from the wavelength selection coupler, wherein the pump laser diodes emit pump signals having wavelengths different from one another in the range of about 1400 to 1510 nm.

Embodying above-mentioned aspects is a method of amplifying an optical fiber by using an optical fiber amplifier for amplifying an optical signal and compensating dispersion of the optical signal, the method comprising the followings steps of: performing density conversion to erbium ions in the optical fiber by using an erbium pump means arranged in a leading end of the optical fiber which is doped with erbium ions and has a dispersion compensating function; compensating loss and dispersion of the optical signal when the optical signal passes through the optical fiber which undergoes density inversion of erbium ions and SRS; and filtering to a desired predetermined level on the optical fiber the optical signal which has undergone density inversion of erbium ions and SRS.

Preferably, the step of performing density inversion of erbium ions comprises: emitting a pump signal, i.e., a pump light signal, having a predetermined pump wavelength in response to a predetermined pump wavelength; coupling the emitted pump signal with an external optical signal to output a coupled optical signal; and performing density inversion of erbium ions and SRS via the coupled optical signal to obtain a desired predetermined level of gain, wherein the pump wavelength is in the range of about 930 to 1030 nm and 1430 to 1530 nm.

The Raman pumping step preferably comprises: emitting a plurality of pump signals having pump wavelengths set different from one another within a desired predetermined range; multiplexing the plurality of emitted pump signals to a multiplexed pump signal; and coupling the multiplexed pump signal with an external optical signal. The erbium-pumped optical fiber obtains a predetermined desired level of gain via SRS in response to the coupled optical signal with the pump wavelengths for Raman pumping being in the range of about 1400 to 1510 nm.

According to the present invention as set forth above, the optical fiber amplifier adopting the erbium-doped ED-DCF can obtain gain according to erbium pumping and Raman pumping, thereby improving the amplification efficiency of an optical signal as well as yielding a better OSNR according to characteristics of the DCF. The optical fiber amplifier adopting the erbium-doped ED-DCF can, moreover, compensate for dispersion as well as realize amplification for an optical signal, thereby affording small form factor. Notably, the present invention can adjust the power of pump signals from the pump LDs for generating pump signals at wavelengths different from one another in the range of about 1400 to 1500 nm, thereby amplifying wavelengths bands such as the C-band in a short wavelength region (i.e., 1530 to 1560 nm) and the L-band in a long wavelength region (i.e., 1570 to 1600 nm).

BRIEF DESCRIPTION OF THE DRAWINGS

The above features and advantages of the present invention will be more apparent from the following detailed description taken in conjunction with the accompanying drawings, in which the same reference numerals are used to designate the same or similar components throughout the several views.

DETAILED DESCRIPTION OF THE PREFERRED EMBODIMENTS

Hereinafter, preferred embodiments of the present invention will be described with reference to the accompanying drawings. Although the following description discloses specific features such as detailed circuit components, it will be apparent to those skilled in the art that these components are provided only to make the present invention more clearly understood and that the present invention can be made without these specific features. In disclosure of the present invention, detailed description of well-known functions or constructions will be omitted where they might otherwise obscure understanding of the invention unnecessarily.

Figure 1:
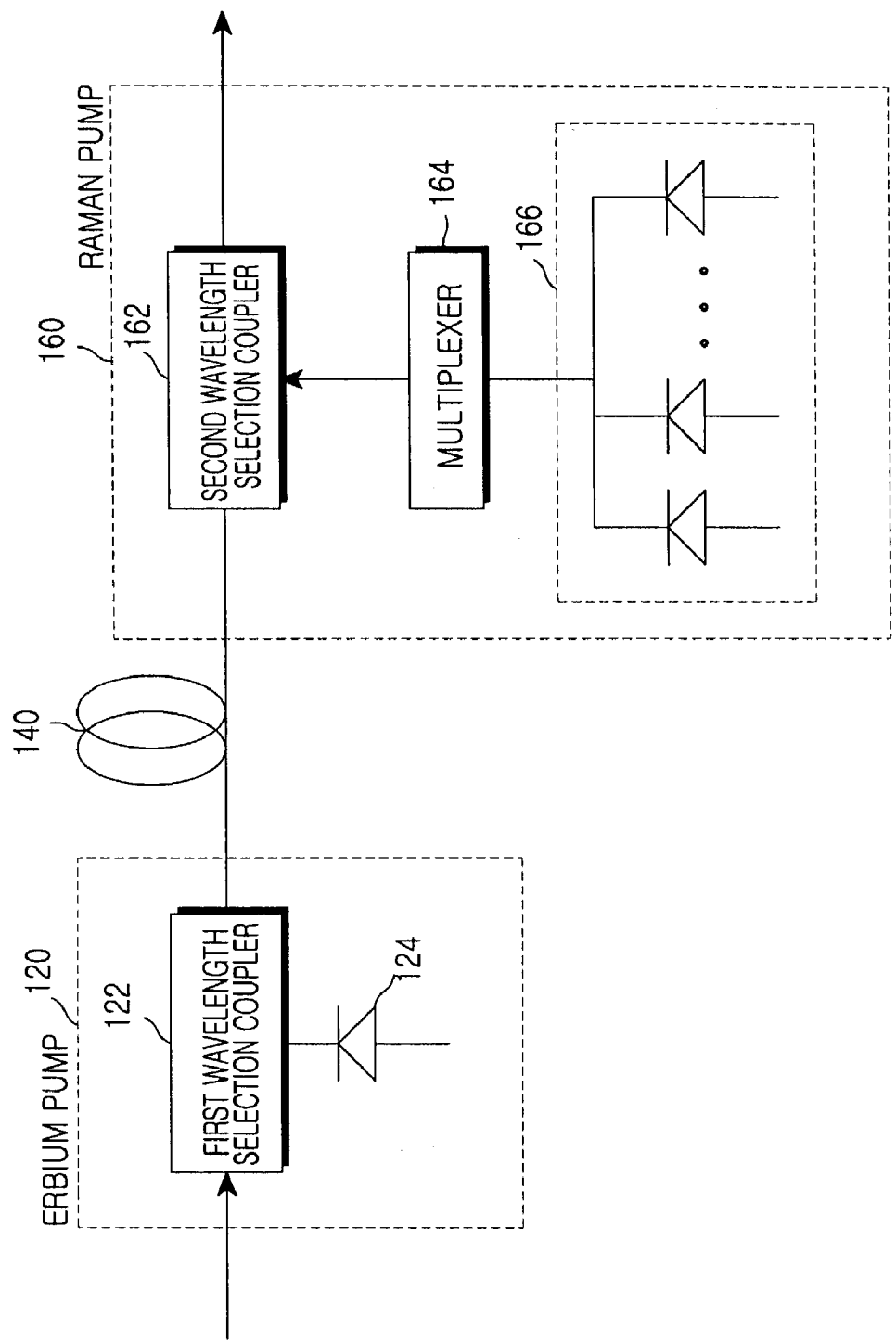
FIG. 1 is a block diagram illustrating an optical fiber amplifier capable of compensating dispersion and loss of an optical signal according to a preferred embodiment of the invention.

FIG. 1 is a block diagram illustrating an optical fiber amplifier capable of compensating for dispersion and loss of an optical signal according to a preferred embodiment of the invention. As shown in FIG. 1, the optical fiber amplifier has an erbium pump 120, an Erbium-Doped Dispersion Compensating Fiber (hereinafter will be referred to as ED-DCF) 140 and a Raman pump 160.

According to a pumping operation of the erbium pump 120, the erbium pump pumps the ED-DCF 140 which is a Dispersion Compensating Fiber (DCF) into which erbium is doped. The Raman pump 160 pumps again the ED-DCF 140 which is pumped by the erbium pump 120.

The erbium pump 120 includes a pump Laser Diode (LD) 124 and a first wavelength selection coupler 122. The pump LD 124 generates a pump signal, i.e., a pump light signal, having a certain wavelength in response to a received signal, and inputs an optical signal corresponding to the pump signal into the first wavelength selection coupler 122. The wavelength of the pump signal generated by the pump LD 124 is set to about 980 or 1480 nm.

When the erbium pump 120 receives an external optical signal, the first wavelength selection coupler 122 of the erbium pump 120 couples the external optical signal and the optical signal from the pump LD 124 into a synthesized signal. The synthesized signal propagates on the ED-DCF 140 to incur density inversion to erbium ions of the ED-DCF 140. As a result, the erbium ions of the ED-DCF 140 undergo stimulated emission so that the ED-DCF 140 can obtain a desired predetermined gain.

The Raman pump 160 includes a plurality of Laser Diodes (LDs) 166, a multiplexer 164 and a second wavelength selection coupler 162. In response to an input signal, the pump LDs 166 generate pump optical signals of various, different wavelengths that have been set within a range of about 1400 to 1500 nm. The multiplexer 164 muxes the pump signals and then transmits the muxed signal to the second wavelength selection coupler 162. The second wavelength selection coupler 162 pumps the ED-DCF 140 based upon the muxed signal from the multiplexer 164. The optical signal from the first wavelength selection coupler, already having been compensated for loss and dispersion, has a wavelength in the range of about 1400 to 1500 nm and about 1550 nm (14xx/1550 nm). The optical signal is further compensated for loss and dispersion while passing through a portion of the ED-DCF 140 undergoing Stimulated Raman Scattering (SRS) by the Raman pump 160. The second wavelength selection coupler 162 of the Raman pump 160 synthesizes the optical signal compensated in loss and dispersion by the ED-DCF 140 with the optical signal incident from the multiplexer 164. The synthesized optical signal is transmitted from the second wavelength coupler 162 to a corresponding device.

Figure 2:
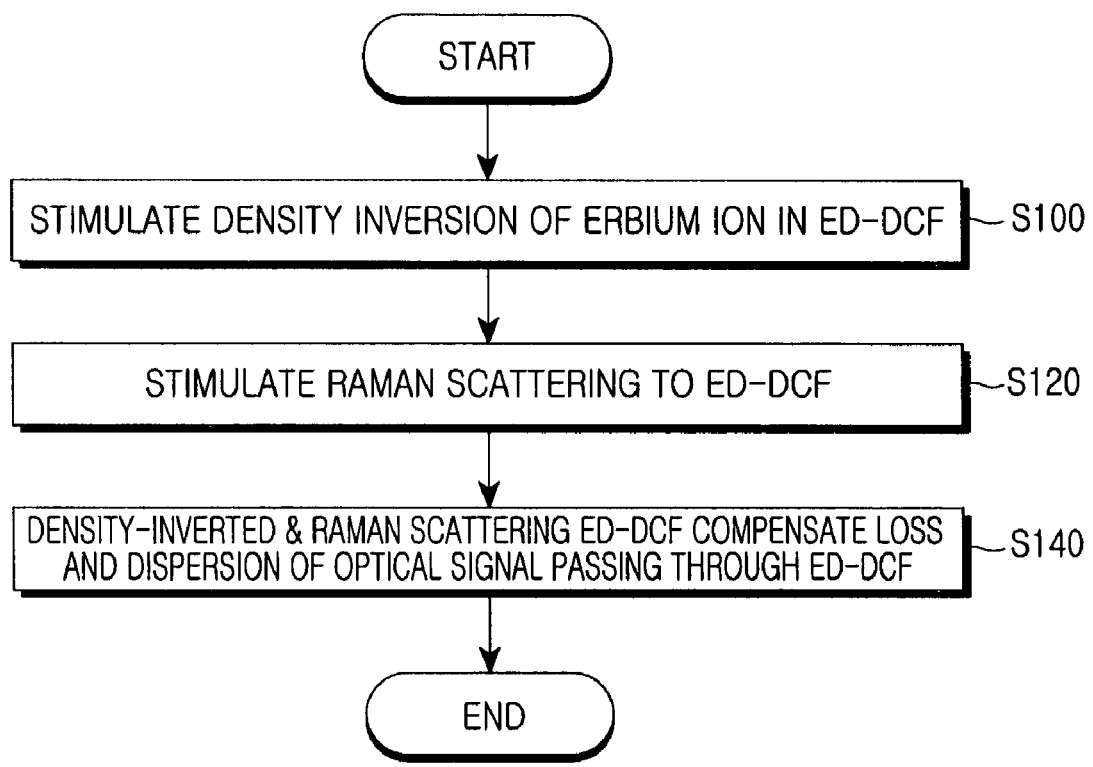
FIG. 2 is a flow chart illustrating a process for compensating dispersion and loss of an optical fiber by using the optical fiber amplifier according to a preferred embodiment of the invention.

FIG. 2 is a flow chart illustrating a process of compensating for dispersion and loss of an optical fiber by using the optical fiber amplifier of FIG. 1 according to a preferred embodiment of the invention. First, the erbium pump 120 performs density inversion of erbium ions on the ED-DCF 140 in S100. The Raman pump 160 performs SRS on the erbium-pumped ED-DCF 140 in S120. When an optical signal passes through the ED-DCF 140 undergoing density inversion of erbium ions and SRS, the ED-DCF 140 compensates for loss and dispersion of the passing optical signal in S140.

Figure 3:
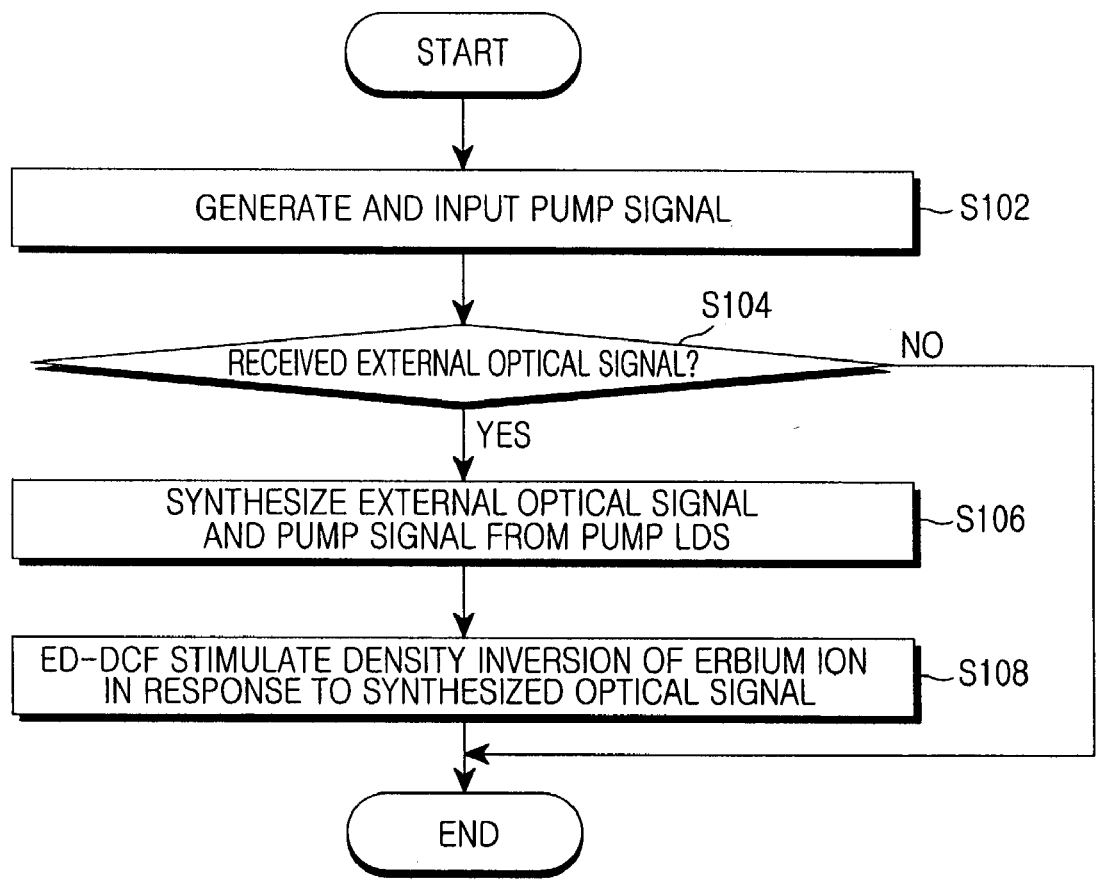
FIG. 3 is a flow chart more specifically illustrating an erbium pumping step in FIG. 2.

FIG. 3 is a flow chart more specifically illustrating the S100 step of density inversion of erbium ions by the erbium pump 120 in FIG. 2. First, the pump LD 124 generates a pump signal having a wavelength which is set in response to the received signal, and inputs the pump signal to the first wavelength selection coupler 122 in S102. The first wavelength selection coupler 122 judges whether an external optical signal is received in S104. If it is judged that the external signal is received, the first wavelength coupler 122 couples or synthesizes the external optical signal and the pump signal from the pump LD 124 in S106. The synthesized optical signal is transmitted from the first wavelength selection coupler 122 to the ED-DCF 140, which obtains a desired predetermined level of gain as erbium ions undergo density inversion and then stimulated emission in response to the synthesized optical signal from the first wavelength selection coupler 122 in S108.

Figure 4:
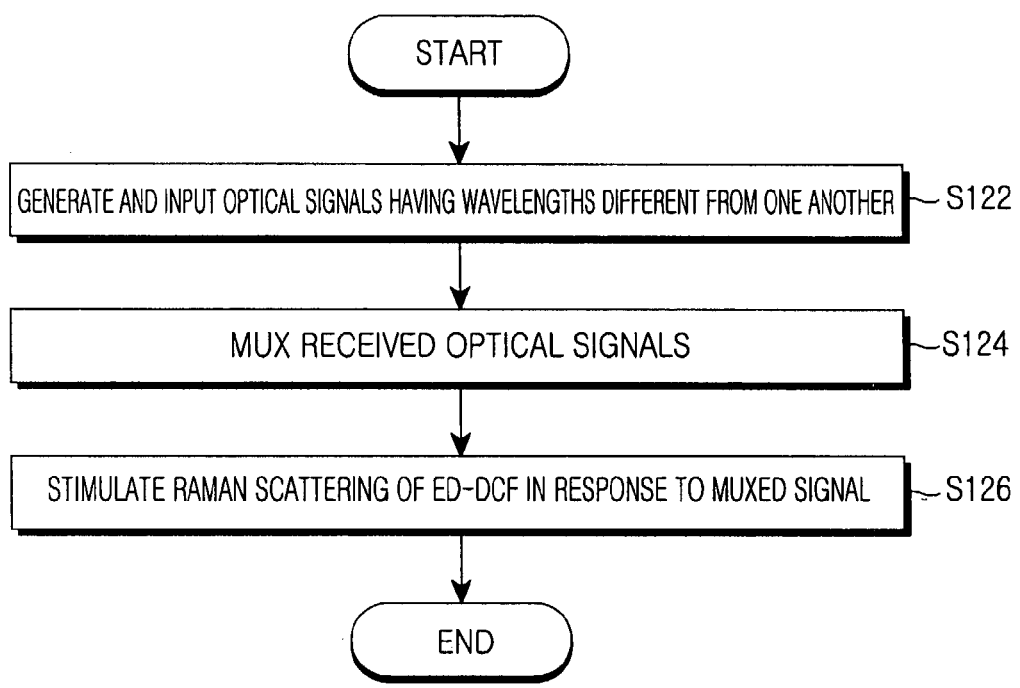
FIG. 4 is a flow chart more specifically illustrating a Raman pumping step in FIG. 2.

FIG. 4 is a flow chart more specifically illustrating the S120 step of stimulating Raman scattering in FIG. 2. First, the plurality of pump LDs 166 generate pump signals having wavelengths different from one another which are set in response to a received signal and input the pump signals to the multiplexer 164 in S122. Each of the plurality of pump LDs 166, for generating the pump signals having wavelengths different from one another, is set to a wavelength in the range of 1400 to 1500 nm. The multiplexer 164 muxes the plurality of pump signals from the plurality of pump LDs 166 into an optical signal having a wavelength in the range of about 1400 to 1500 nm, and transmits the muxed optical signal to the second wavelength selection coupler 162 in S124.

The second wavelength selection coupler 162 obtains a desired predetermined level of gain via SRS in the ED-DCF 140 based upon the optical signal muxed in the multiplexer 164 in S126. The optical signal to be coupled in the second wavelength selection coupler 162 has a wavelength in the range of about 1400 to 1500 nm and about 1550 nm (which is referred to as 14xx/1550 nm).

The coupled optical signal from the first wavelength selection coupler 122 is accordingly compensated in loss and dispersion while passing through the ED-DCF 140 which undergoes density inversion by the erbium pump 120 and SRS by the Raman pump 160.

Figure 5:
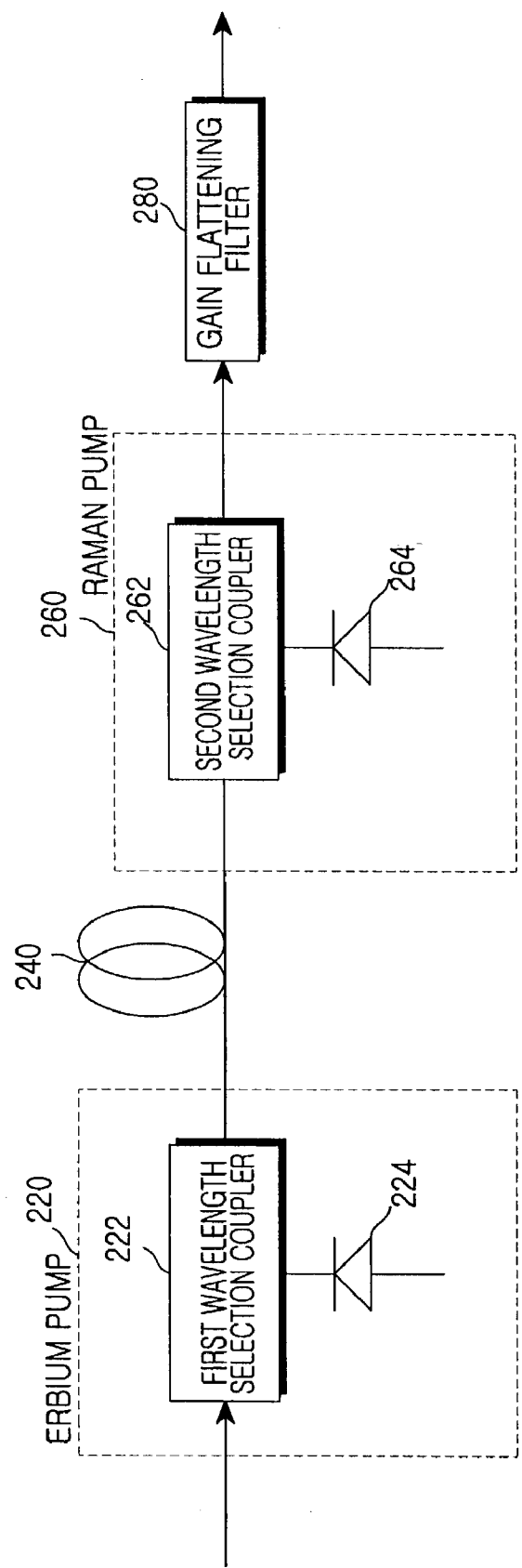
FIG. 5 is a block diagram illustrating an optical fiber amplifier capable of compensating dispersion and loss of an optical signal according to an alternative embodiment of the invention.

FIG. 5 is a block diagram illustrating an optical fiber amplifier capable of compensating dispersion and loss of an optical signal according to an alternative embodiment of the invention. As shown in FIG. 5, the optical amplifier has an erbium pump 220, an ED-DCF 240, a Raman pump 260 and a gain flattening filter 280.

The erbium pump 220 performs density inversion to erbium ions with respect to the ED-DCF 240. The ED-DCF 240 is pumped via a pumping operation of the erbium pump 220. The Raman pump 260 performs a Raman pumping operation with respect to the ED-DCF 240 which is erbium-pumped via the pumping operation of the erbium pump 220. After an optical signal passes through the ED-DCF 240 which is pumped via the pumping operation of the erbium pump 220 and the Raman pump 260, the gain flattening filter 280 filters the optical signal to a desired predetermined flat level, thereby flattening the gain of the optical signal.

The erbium pump has a pump LD 224 and a first wavelength selection coupler 222. The pump LD 224 generates a pump signal having a desired predetermined wavelength in response to a received signal, and inputs the pump signal to the first wavelength selection coupler 222. The wavelength of the pump signal to be generated by the pump LD 224 is set to about 980 or 1480 nm.

When an external optical signal is received in the erbium pump 220, the first wavelength selection coupler 222 couples the received optical signal and the pump signal provided from the pump LD 224 into a coupled optical signal. The coupled optical signal propagates to the ED-DCF 240, and after the erbium-ions are density-inverted, the ED-DCF 240 outputs the coupled optical signal via stimulated emission, thereby obtaining a desired predetermined level of gain.

The Raman pump 260 has a pump LD 264 and a second wavelength selection coupler 262. The pump LD 264 generates a pump signal having a wavelength which is set in response to a received signal, and inputs the pump signal into the second wavelength selection coupler 262. The second wavelength selection coupler 262 obtains a desired predetermined level of gain owing to SRS in the ED-DCF 140 based upon the optical signal incident from the pump LD 264.

The coupled optical signal from the first wavelength selection coupler 222 is accordingly compensated for loss and dispersion while passing through the ED-DCF 240 which undergoes density inversion by the erbium pump 220 and SRS by the Raman pump 260. The second wavelength selection coupler 262 of the Raman pump 260 synthesizes the optical signal which is loss- and dispersion-compensated in the ED-DCF 240 together with the optical signal incident from the pump 264.

The optical signal synthesized by the second wavelength selection coupler 262 is transmitted to the gain flattening filter 280. Then, the gain flattening filter 280 performs gain flattening on the optical signal incident from the second wavelength selection coupler 262 so that the optical signal maintains a desired predetermined level of gain.

The optical fiber amplifier flattens the gain of the optical signal which is compensated in loss and dispersion, thereby affording a desired predetermined gain with higher efficiency.

Figure 6:
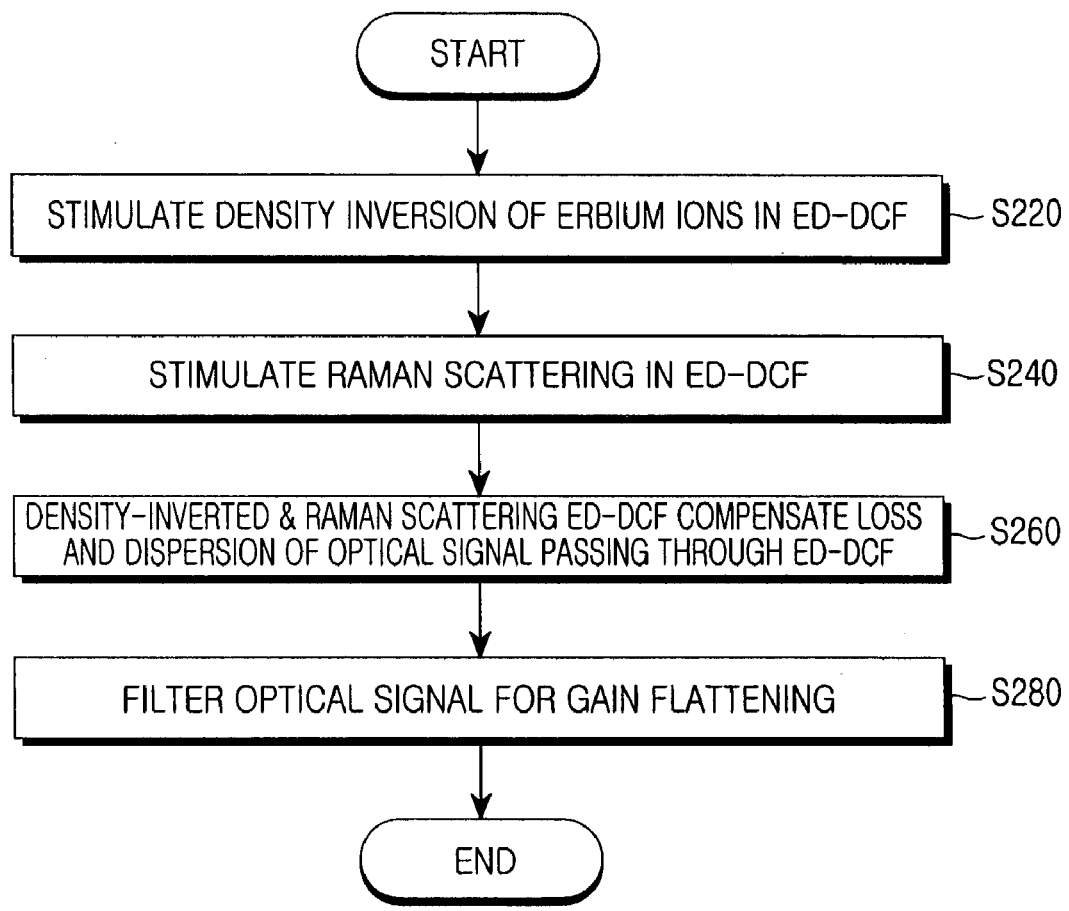
FIG. 6 is a flow chart illustrating a process for compensating dispersion and loss of an optical fiber by using the optical fiber amplifier according to the alternative embodiment of the invention.

FIG. 6 is a flow chart illustrating a process of compensating for dispersion and loss in an optical fiber by using the optical fiber amplifier according to the alternative embodiment of the invention as depicted in FIG. 5.

First, the erbium pump 220 performs density inversion of erbium ions in the ED-DCF 240 in S220. The Raman pump 260 performs SRS on the erbium-pumped ED-DCF 140 in S240. When an optical signal passes through the ED-DCF 240 which undergoes density inversion of erbium ions and SRS, the ED-DCF 140 compensates for loss and dispersion in the passing optical signal in S260. Upon receiving the optical signal on ED-DCF 240 which has undergone density inversion of erbium ions and SRS the gain flattening filter 280 performs gain-flattening filtering on the received optical signal to flatten the gain of the signal to a desired predetermined level in S280.

Figure 7:
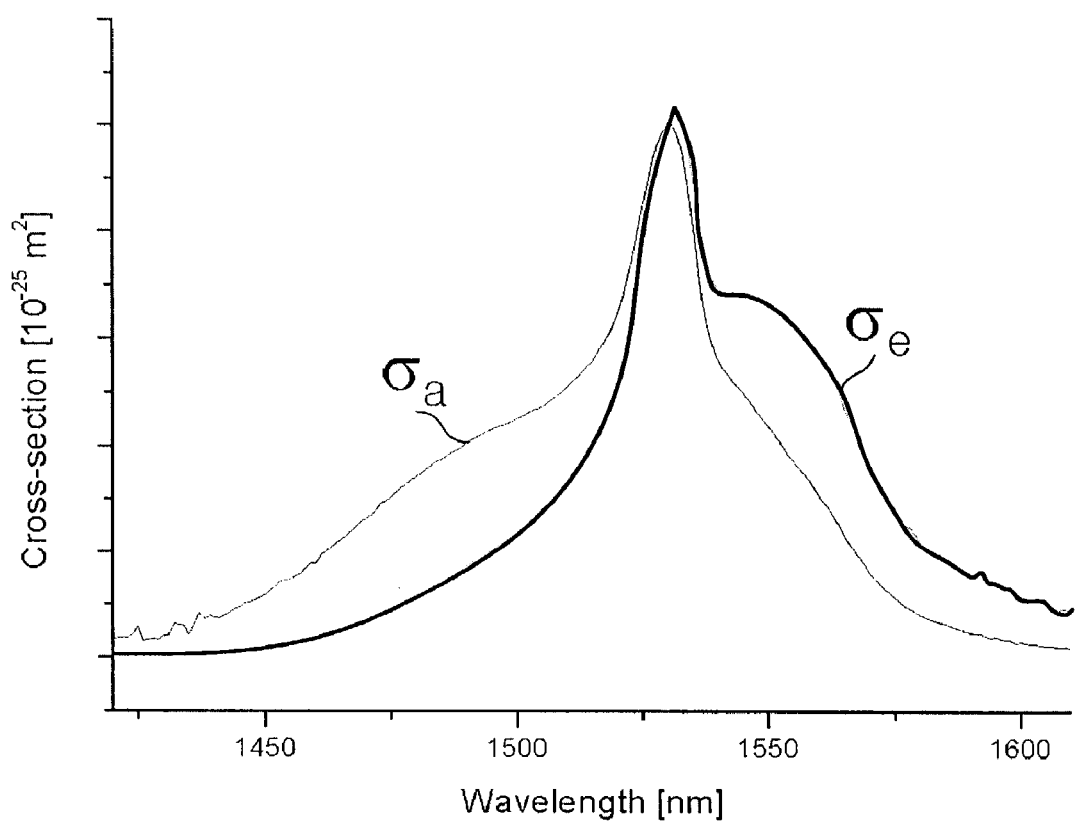
FIG. 7 is a graph illustrating variation in absorption and emission cross sections of erbium ions doped into an ED-DCF.

FIG. 7 is a graph illustrating variation in absorption and emission cross sections of erbium ions doped into either of the ED-DCFs 140, 240. The graph accordingly relates to an optical signal passing through the ED-DCF 140, 240, undergoing density inversion of erbium ions by the erbium pump 120, 220 via at least one pump signal having a wavelength or wavelengths of about 980 or 1480 nm incident from the pump LD 124, 224. As illustrated in FIG. 7, the emission cross section $\sigma_e$ is larger than the absorption cross section $\sigma_a$ in the 1550 nm region according to characteristics of the erbium ions distributed in the ED-DCF 140, 240. The optical signal is consequently amplified wavelengths in the 1550 nm region.

Figure 8:
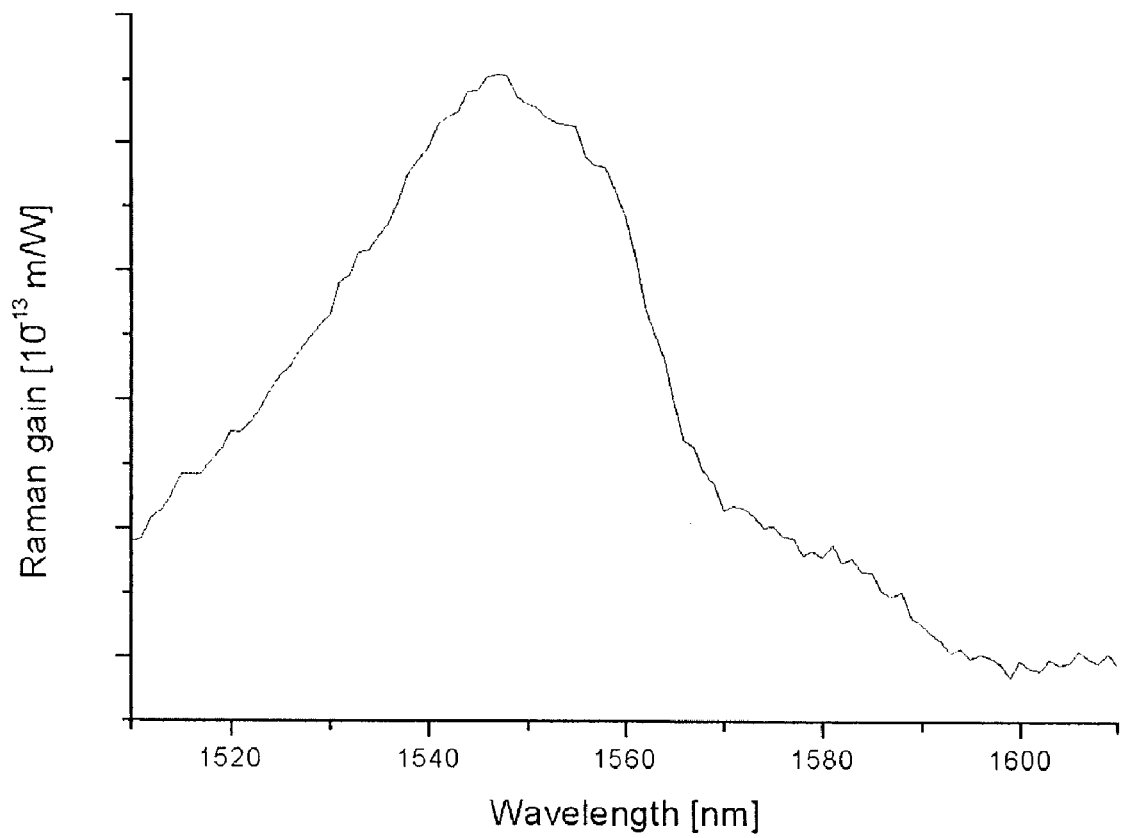
FIG. 8 is a graph illustrating the Raman gain of an optical signal emitted from an ED-DCF which is Raman-pumped at a wavelength of about 1450 nm.

FIG. 8 is a graph illustrating the Raman gain of an optical signal emitted from either of the ED-DCFs 140, 240 which is Raman-pumped at a wavelength of about 1450 nm.

For the optical signal which passes through the ED-DCF 140, 240 which is Raman-pumped via a pump signal incident from the pump LD(s) 166, 264 of the Raman pump 160, 260, the gain can be higher in a wavelength region of about 1550 nm, distanced at about 100 nm from any pump wavelength in the range of about 1400 to 1500 nm according to SRS. The optical signal is subject to additional gain owing to erbium since absorption occurs by erbium ions at a wavelength in the range of about 1400 to 1500 nm.

The optical fiber amplifier is more preferably adapted to perform forward pumping to the ED-DCF 140 via a pump signal having a wavelength of about 980 nm by using the pump LD 124 of the erbium pump 120 and backward pumping to the ED-DCF 140 via pump signals having wavelengths different from one another by using the pump LDs 166 of the Raman pump 160 as shown in FIG. 1. As a result, the present invention can realize an optical fiber amplifier doped with erbium for compensating dispersion with optimal efficiency. Moreover, higher amplification efficiency can be achieved since the pump LD 124 for generating a pump signal at a wavelength of about 980 nm can attain an excellent noise figure level according to characteristics of the wavelength of about 980 nm, the pump LDs 166 for generating pump signals at wavelengths in the range of 1400 to 1500 nm can attain a desired predetermined level of Raman gain according to Raman dispersion, and erbium ions distributed in the ED-DCF 140 can create a desired predetermined level of gain.

When either of the ED-DCFs 140, 240 is pumped, the pump signal having wavelengths in the range of 980, 1480 and 1400 to 1500 nm incident from the pump LD(s) 124, 166 is partially absorbed by the erbium ions, thereby affording a desired predetermined gain owing to the erbium ions. A desired predetermined Raman gain can also be obtained via a pump signal in the range of about 1480 and 1400 to 1500 nm which is not absorbed by the erbium ions. It is necessary, as a consequence, to lower the concentration of the erbium ions doped into the ED-DCF 140, 240. Since, however, the target Raman gain can be obtained despite erbium ions doped into the ED-DCF 140, 240 having a low level of concentration, amplification efficiency in the optical signal is generally improved.

As suggested from FIG. 1, use of the pump LDs 166 for generating pump signals at wavelengths different from one another in the range of 1400 to 1500 nm allows the power of the pump signals at the respective pump wavelengths to be adjusted without performing filtering for flattening the gain of the optical signals. Such adjustment in this wavelength range can result in amplifying wavelength bands such as the C-band in a short wavelength region (i.e., 1530 to 1560 nm) and the L-band in a long wavelength region (i.e., 1570 to 1600 nm).

The inventive optical fiber amplifier doped with erbium for compensating dispersion in an optical signal has a transmission length of about several to tens of kilometers. Owing to distributed amplification in an interval of several to tens of kilometers, the optical fiber amplifier of the invention offers an OSNR better than that available in utilization of a conventional lumped amplifier. Further, since the optical fiber amplifier of the invention offers the added feature of compensating for dispersion of the optical signal accumulated in transmission thereof while amplifying the optical signal, it is unnecessary to provide an additional optical fiber amplifier for compensating dispersion of the optical signal or to incorporate the additional optical fiber amplifier into a small-sized module.

According to the invention as set forth above, the optical fiber amplifier adopting the erbium-doped ED-DCF can obtain gain according to erbium pumping and Raman pumping, thereby improving the amplification efficiency of an optical signal as well as obtaining more excellent OSNR according to characteristics of the DCF.

Further, the optical fiber amplifier adopting the erbium-doped ED-DCF can compensate dispersion as well as amplification of an optical signal, thereby realizing a small form factor.

Moreover, the present invention can adjust the power of pump signals from the pump LDs at wavelengths different from one another in the range of about 1400 to 1500 nm, thereby amplifying wavelengths bands such as the C-band in a short wavelength region (i.e., 1530 to 1560 nm) and the L-band in a long wavelength region (i.e., 1570 to 1600 nm).

Although preferred embodiments of the present invention have been described for illustrative purposes, the present invention is not restricted to the foregoing embodiments, and it will be apparent to those skilled in the art that various modifications, additions and substitutions can be made without departing from the scope and spirit of the invention defined by the accompanying claims.

What is claimed is:

1. An optical fiber amplifier comprising:
   Dispersion Compensating Fiber (DCF) doped with erbium ions
   an erbium pump means configured for performing forward pumping to the DCF; and
   a Raman pump means configured for performing backward pumping to the DCF which is forward-pumped by the erbium pump means.

2. An optical fiber amplifier in accordance with claim 1, wherein the erbium pump means includes:
   a pump laser diode for emitting a pump signal having a predetermined pump wavelength; and
   a wavelength selection coupler for coupling the pump signal emitted from the pump laser diode with an external optical signal to output a coupled optical signal for performing forward pumping to the DCF.

3. An optical fiber amplifier in accordance with claim 2, wherein the pump signal emitted by the pump laser diode has a pump wavelength in a range of at least one of 930 to 1030 nm and 1430 to 1530 nm.

4. An optical fiber amplifier in accordance with claim 1, wherein the Raman pump means includes:
- a plurality of pump laser diodes for generating and emitting plurality of pump signals having wavelengths different from one another in response to pump wavelengths which are set different from one another within a desired predetermined range;
- a multiplexer for multiplexing the pump signals emitted from the pump laser diodes; and
- a wavelength selection coupler for coupling an optical signal multiplexed by the multiplexer and an external optical signal to output a coupled optical signal for performing backward pumping to the DCF.

5. An optical fiber amplifier in accordance with claim 4, wherein the pump laser diodes emit pump signals having wavelengths different from one another in a range of 1400 to 1510 nm.

6. An optical fiber amplifier comprising:
Dispersion Compensating Fiber (DCF) doped with erbium ions
an erbium pump means configured for performing forward pumping to the DCF; and
a Raman pump means configured for performing backward pumping to the DCF which is forward-pumped by the erbium pump means; and
a gain flattening filter for filtering an optical signal on the DCF to a desired predetermined level, the DCF being pumped by the erbium pump means and the Raman pump means.

7. An optical fiber amplifier in accordance with claim 6, wherein the erbium pump means includes:
- a pump laser diode for emitting a pump signal having a predetermined pump wavelength; and
- a wavelength selection coupler for coupling the pump signal emitted from the pump laser diode with an external optical signal to output a coupled optical signal for performing forward pumping to the DCF.

8. An optical fiber amplifier in accordance with claim 7, wherein the pump laser diode emits the pump signal having a pump wavelength in a range of at least one of 930 to 1030 nm and 1430 to 1530 nm.

9. An optical fiber amplifier in accordance with claim 6, wherein the Raman pump means includes:
- a plurality of pump laser diodes for generating and emitting plurality of pump signals having wavelengths different from one another in response to pump wavelengths which are set different from one another within a desired predetermined range;
- a multiplexer for multiplexing the pump signals emitted from the pump laser diodes; and
- a wavelength selection coupler for coupling an optical signal multiplexed by the multiplexer and an external optical signal to output a coupled optical signal for performing backward pumping to the DCF.

10. An optical fiber amplifier in accordance with claim 9, wherein the pump laser diodes emit pump signals having wavelengths different from one another in a range of 1400 to 1510 nm.

11. A method for amplifying an optical signal, the method comprising the followings steps of:
performing a forward erbium pumping to a Dispersion Compensating Fiber (DCF) doped with erbium ions; and
performing a backward Raman pumping to the erbium-pumped DCF.

12. A method of amplifying an optical signal in accordance with claim 11, wherein the erbium pumping step comprises:
emitting a pump signal having a predetermined pump wavelength;
coupling the emitted pump signal with an external optical signal to output a coupled optical signal; and
performing forward amplification pumping to the DCF via the coupled optical signal.

13. A method for amplifying an optical signal in accordance with claim 12, wherein the emitting step emits a pump wavelength in a range of at least one of 930 to 1030 nm and 1430 to 1530 nm.

14. A method of amplifying an optical signal in accordance with claim 11, wherein the Raman pumping step comprises:
emitting a plurality of pump signals having pump wavelengths set different from one another within a desired predetermined range;
multiplexing the plurality of emitted pump signals to a multiplexed pump signal; and coupling the multiplexed pump signal with an external optical signal.

15. A method for amplifying an optical signal in accordance with claim 14, wherein the emitting step emits a plurality of pump signals having wavelengths in a range of 1400 to 1510 nm.

16. A method of amplifying an optical signal, the method comprising the followings steps of:
performing a forward erbium pumping to a Dispersion Compensating Fiber (DCF) doped with erbium ions;
performing a backward Raman pumping to the erbium-pumped DCF; and
filtering to a desired predetermined level on the DCF an optical signal that has been erbium-pumped and Raman-pumped.

17. A method for amplifying an optical signal in accordance with claim 16, wherein the erbium-pumping step comprises:
emitting a pump signal having a predetermined pump wavelength;
coupling the emitted pump signal with an external optical signal to output a coupled optical signal; and
performing forward amplification pumping to the DCF via the coupled optical signal.

18. A method for amplifying an optical signal in accordance with claim 17, wherein the emitting step emits a pump wavelength in a range of at least one of 930 to 1030 nm and 1430 to 1530 nm.

19. A method for amplifying an optical signal in accordance with claim 16, wherein the Raman pumping step comprises:
emitting a plurality of pump signals having pump wavelengths set different from one another within a desired predetermined range;
multiplexing the plurality of emitted pump signals to a multiplexed pump signal; and
coupling the multiplexed pump signal with an external optical signal.

20. A method for amplifying an optical signal in accordance with claim 19, wherein the emitting step emits a plurality of pump signals having wavelengths in the range of 1400 to 1510 nm.

* * * * *